United States Patent
Iwai

(10) Patent No.: US 11,729,657 B2
(45) Date of Patent: Aug. 15, 2023

(54) APPARATUS AND METHOD FOR COMMUNICATION NETWORK

(71) Applicant: NEC CORPORATION, Tokyo (JP)

(72) Inventor: Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 77 days.

(21) Appl. No.: 16/491,231

(22) PCT Filed: Dec. 15, 2017

(86) PCT No.: PCT/JP2017/045067
§ 371 (c)(1),
(2) Date: Sep. 5, 2019

(87) PCT Pub. No.: WO2018/163556
PCT Pub. Date: Sep. 13, 2018

(65) Prior Publication Data
US 2020/0037196 A1    Jan. 30, 2020

(30) Foreign Application Priority Data
Mar. 8, 2017    (JP) .................................. 2017-044322

(51) Int. Cl.
*H04W 28/02*    (2009.01)
*H04W 28/06*    (2009.01)
(Continued)

(52) U.S. Cl.
CPC ....... *H04W 28/0263* (2013.01); *H04W 16/14* (2013.01); *H04W 28/0268* (2013.01);
(Continued)

(58) Field of Classification Search
CPC . H04W 28/02; H04W 16/14; H04W 28/0268; H04W 28/16; H04W 24/08; H04W 28/0831
See application file for complete search history.

(56) References Cited

U.S. PATENT DOCUMENTS 9,245,241 B2 *  1/2016  Kite ....................... H04L 41/12
9,917,641 B2 *  3/2018  Guo ....................... H04L 41/12
(Continued)

FOREIGN PATENT DOCUMENTS

CN        107810619      *   6/2016    ........... H04L 41/145
JP       2003-318979 A      11/2003
(Continued)

OTHER PUBLICATIONS

"The Tactile Internet", ITU-T Technology Watch Report, Aug. 2014, 24 pages, [retrieved on Feb. 27, 2017], <URL:http://www.itu.int/oth/T2301000023/en>.
(Continued)

*Primary Examiner* — Diane L Lo
*Assistant Examiner* — Abusayeed M Haque
(74) *Attorney, Agent, or Firm* — Sughrue Mion, PLLC

(57) ABSTRACT

A control apparatus (40) is configured to acquire a required end-to-end performance required for an end-to-end path from a first end node to a second end node, and determine each required segment performance required for a respective one of the path segments based on the required end-to-end performance. The control apparatus (40) is further configured to communicate with a node included in each path segment or communicate with an entity controlling the path segment to enforce a corresponding one of the required segment performances in the path segment. The control apparatus (40) is further configured to update a required segment performance currently enforced in at least one path segment based on an achievement status of each of the required segment performances in the respective path segments. It is thus, for example, possible to contribute to guaranteeing the required end-to-end performance even when quality of each path segment changes.

19 Claims, 8 Drawing Sheets

(51) Int. Cl.
*H04W 16/18* (2009.01)
*H04W 16/14* (2009.01)
*H04W 28/16* (2009.01)
*H04W 72/04* (2023.01)
*H04W 88/08* (2009.01)

(52) U.S. Cl.
CPC ........... *H04W 28/16* (2013.01); *H04W 72/04* (2013.01); *H04W 88/08* (2013.01)

(56) References Cited

U.S. PATENT DOCUMENTS

| | | | | |
|---|---|---|---|---|
| 2008/0117892 | A1* | 5/2008 | Bahr | H04L 45/12 370/351 |
| 2011/0164518 | A1* | 7/2011 | Daraiseh | H04L 45/121 370/252 |
| 2012/0089664 | A1* | 4/2012 | Igelka | G06F 9/5083 709/203 |
| 2014/0122706 | A1* | 5/2014 | Boerner | G06F 9/5011 709/224 |
| 2014/0269413 | A1* | 9/2014 | Hui | H04L 45/18 370/254 |
| 2014/0369218 | A1* | 12/2014 | Ionta | H04L 43/062 370/252 |
| 2015/0172102 | A1* | 6/2015 | DeCusatis | H04L 43/0876 370/218 |
| 2015/0172208 | A1* | 6/2015 | DeCusatis | H04L 41/0806 709/226 |
| 2015/0350018 | A1* | 12/2015 | Hui | H04L 47/25 370/254 |
| 2015/0365954 | A1* | 12/2015 | Levine | H04W 72/563 455/450 |
| 2016/0014229 | A1* | 1/2016 | Seedorf | H04L 47/2475 370/235 |
| 2016/0164770 | A1* | 6/2016 | Liu | H04L 45/023 370/254 |
| 2016/0380892 | A1* | 12/2016 | Mahadevan | H04L 45/70 370/389 |
| 2017/0310550 | A1* | 10/2017 | Mandle | H04L 41/12 |
| 2017/0353382 | A1* | 12/2017 | Gupta | H04L 12/1863 |

FOREIGN PATENT DOCUMENTS

| | | |
|---|---|---|
| JP | 2004-128798 A | 4/2004 |
| WO | 2016/093166 A1 | 6/2016 |
| WO | 2017/003690 A1 | 1/2017 |

OTHER PUBLICATIONS

"5G End-to-End Slicing Demo", Huawei Technologies, Dec. 7, 2016, FG-IMT-2020 Geneva, 36 pages.
International Search Report for PCT/JP2017/045067, dated Feb. 13, 2018.

* cited by examiner

APPARATUS AND METHOD FOR COMMUNICATION NETWORK

This application is a National Stage of International Application No. PCT/JP2017/045067 filed Dec. 15, 2017, claiming priority based on Japanese Patent Application No. 2017-044322 filed Mar. 8, 2017 the disclosure of which is incorporated herein in its entirety by reference.

TECHNICAL FIELD

The present disclosure relates to control over a communication network and, in particular, to control of a plurality of path segments forming an end-to-end path.

BACKGROUND ART

Providing ultra-low latency services through a radio communication network has been studied. Ultra-low latency services may include mission critical communications. For example, the 3rd Generation Partnership Project (3GPP) has started to work on the standardization for the fifth generation mobile communication system (5G), i.e., 3GPP Release 14, in 2016 to make it a commercial reality in 2020. The requirements for the 5G system architecture include support of mission critical communications.

Ultra-low latency services or mission critical communications include, for example, intelligent transport systems, industrial automation, robotics, the haptic or tactile internet, virtual reality, and augmented reality. The ultra-low latency services and mission critical communications require end-to-end latency in the order of milliseconds. For example, Non-patent Literature 1 describes that 1-millisecond end-to-end latency is required in tactile internet applications.

Ultra-low latency services and mission critical communications also require reliability. The term "reliability" means a capability of guaranteeing message transmission within a defined end-to-end latency (i.e., a delay budget, e.g., 1 millisecond).

CITATION LIST

Non Patent Literature

Non-patent Literature 1: ITU-T Technology Watch Report (August 2014)—The Tactile Internet, [retrieved on 2017-02-27], <URL: http://www.itu.int/oth/T2301000023/en>

SUMMARY OF INVENTION

Technical Problem

A communication path between two end nodes, such as a sensor and an actuator (hereinafter referred to as an end-to-end path) includes two or more path segments. In order to guarantee predetermined end-to-end latency, it is required to set a delay target (or delay objective) on each path segment and enforce the respective delay targets on the path segments.

However, it should be noted that quality or a performance of each path segment dynamically changes. For example, the two or more path segments include a radio access network (RAN) segment (i.e., an air interface) between a base station and a terminal, and a wired network segment between the base station and an application server. The quality or performance (e.g., throughput) of the RAN segment (the air interface) varies due to fading and interference. The quality or performance of the wired network segment may vary depending on processing the load on a network entity (e.g., a base station, a router, or a gateway).

Acceptable end-to-end latency is an example of a performance required for the end-to-end path (hereinafter referred to as a required end-to-end performance). In another example, the required end-to-end performance may be end-to-end throughput.

One of the objects to be attained by embodiments disclosed herein is to provide an apparatus, a method, and a program that contribute to guaranteeing a required end-to-end performance even when quality of each path segment changes. It should be noted that the above-described object is merely one of the objects to be attained by the embodiments disclosed herein. Other objects or problems and novel features will be made apparent from the following description and the accompanying drawings.

Solution to Problem

In a first aspect, a control apparatus includes a memory, and at least one processor coupled to the memory and configured to execute a plurality of modules. The modules include an acquisition module, a control module, and an enforcement module. The acquisition module is configured to acquire a required end-to-end performance required for an end-to-end path from a first end node to a second end node. The end-to-end path includes the first and second end nodes and at least one intermediate node, and the end-to-end path includes a plurality of path segments. The control module is configured to determine each required segment performance required for a respective one of the path segments based on the required end-to-end performance. The enforcement module is configured to communicate with a node included in each path segment or communicate with an entity controlling the path segment to enforce a corresponding one of the required segment performances in the path segment. The control module is further configured to update a required segment performance currently enforced in at least one path segment based on an achievement status of each of the required segment performances in the respective path segments.

In a second aspect, a method performed by a control apparatus includes:
(a) acquiring a required end-to-end performance required for an end-to-end path from a first end node to a second end node, the end-to-end path including the first and second end nodes and at least one intermediate node, the end-to-end path including a plurality of path segments;
(b) determining each required segment performance required for a respective one of the path segments based on the required end-to-end performance;
(c) communicating with a node included in each path segment or communicating with an entity controlling the path segment in order to enforce a corresponding one of the required segment performances in the path segment, and
(d) updating a required segment performance currently enforced in at least one path segment based on an achievement status of each of the required segment performances in the respective path segments.

In a third aspect, a program includes a set of instructions (software codes) that, when loaded into a computer, causes the computer to perform a method according to the above-described second aspect.

Advantageous Effects of Invention

According to the above-described aspect, it is possible to provide an apparatus, method, and program that contribute to guaranteeing a required end-to-end performance even when quality of each path segment changes.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

First Embodiment

Figure 1:
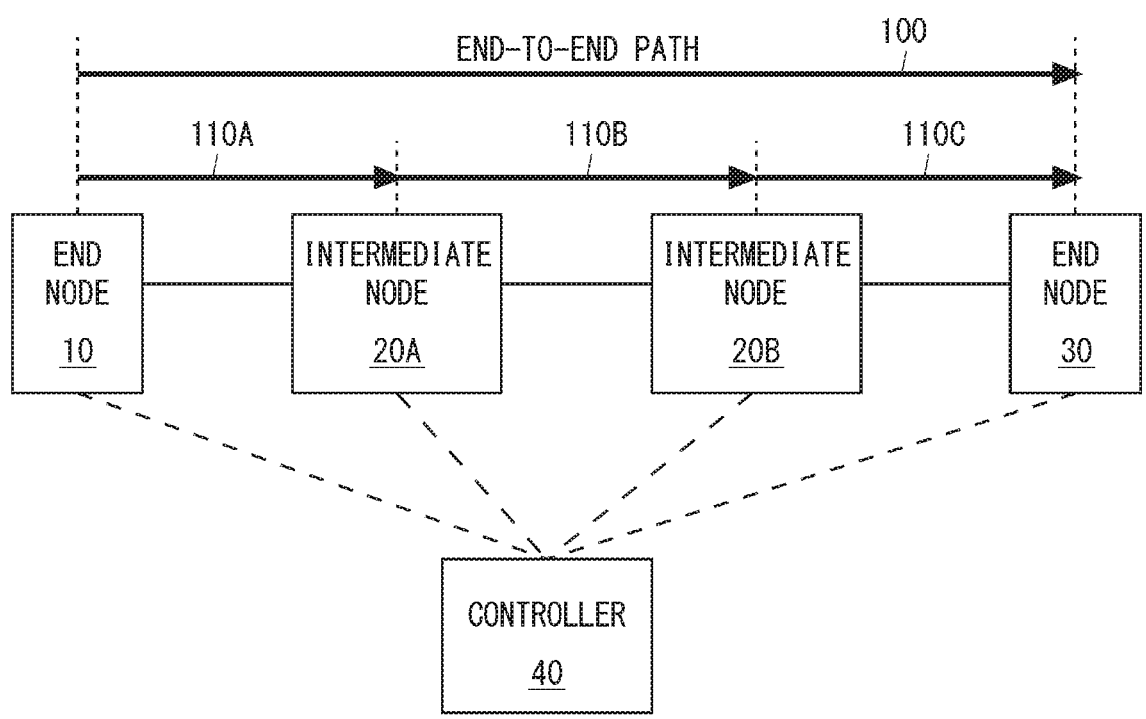
FIG. 1 shows a configuration example of a communication network according to a first embodiment.

FIG. 1 shows a configuration example of a communication network according to some embodiments including this embodiment. In the example shown in FIG. 1, the communication network includes an end node 10, intermediate nodes 20A and 20B, and an end node 30. An end-to-end path 100 is a communication path from the end node 10 to the end node 30. The end node 10 may be referred to as a sender end node while the end node 30 may be referred to as a receiver end node.

In the cases of the tactile internet and industrial automation, the end node 10 may be a computer installed in a sensor and the end node 30 may be a computer installed in an actuator. In the case of an Intelligent Transportation System (ITS), both of the end nodes 10 and 30 may be computers installed in automobiles. Alternatively, one of the end nodes 10 and 30 may be a computer installed in an automobile while the other end node may be an ITS application server.

The end-to-end path 100 is composed of two or more path segments 110. Accordingly, the end-to-end path 100 includes at least one intermediate node 20. In the example shown in FIG. 1, the end-to-end path 100 is divided into three path segments 110A, 110B and 110C. The path segment 110A is a communication path from the (sender) end node 10 to the intermediate node 20A. The path segment 110B is a communication path from the intermediate node 20A to the intermediate node 20B. The path segment 110C is a communication path from the intermediate node 20B to the (receiver) end node 30.

The end-to-end path 100 is a communication path in the application layer and transfers application-layer messages. In other words, the end-to-end path 100 transfers an application-layer packet flow. Both of the end nodes 10 and 30 support an application-layer protocol and process application-layer messages.

Further, at least one intermediate node 20 may support the application-layer protocol and process application-layer messages. That is, a communication event (or a communication transaction) that is performed on the end-to-end path 100 may include two or more application-layer communications.

For example, in the above-described case of the haptic internet and industrial automation, at least one intermediate node 20 may be a control/steering server that controls the actuator (i.e., the end node 30) on the basis of sensing data received from the sensor (i.e., the end node 10). In the case of the Intelligent Transportation System (ITS), at least one intermediate node 20 may be an ITS server that receives a message or data from an automobile (i.e., the end node 10) and controls the automobile or another automobile (i.e., the end node 30).

Additionally or alternatively, some or all of the one or more intermediate nodes 20 may support the network layer (i.e., Layer 3, e.g., the Internet Protocol (IP) layer) and transfer a packet(s) containing an application-layer message between the end nodes 10 and 30. For example, each intermediate node 20 may be an IP router or a gateway.

Additionally or alternatively, at least one intermediate node 20 may be a RAN node (e.g., base station, eNodeB, or Radio Network Controller (RNC)) that communicates with the end node 10 or 30 through an air interface.

FIGS. 2 to 5 show several specific examples of the end-to-end path 100. In the example shown in FIG. 2, the end-to-end path 100 is a communication path from a radio terminal (User Equipment (UE)) 210 to an application server 270. Accordingly, the UE 210 corresponds to the (sender) end node 10 and the application server 270 corresponds to the (receiver) end node 30.

Figure 2:
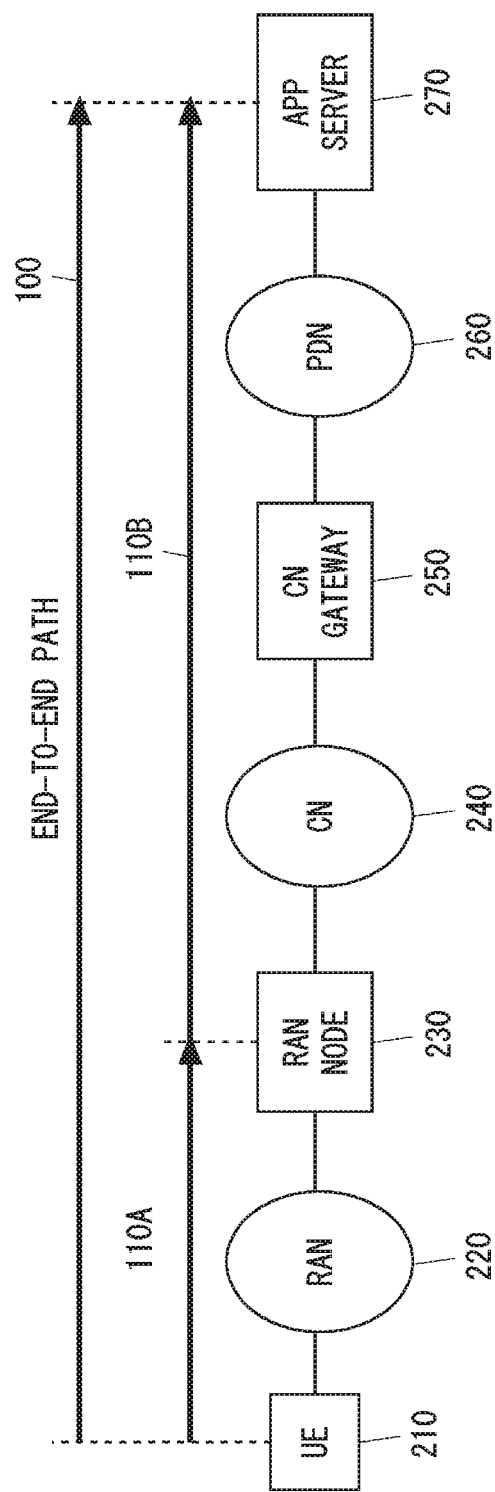
FIG. 2 shows an example of an end-to-end path.

The end-to-end path 100 shown in FIG. 2 is divided into two path segments 110A and 110B by a RAN node 230. The RAN node 230 corresponds to the intermediate node 20. The path segment 110A in FIG. 2 is a communication path from the UE 210 to the RAN node 230 through a RAN 220 (i.e., an uplink air interface). The path segment 110B in FIG. 2 is a communication path from the RAN node 230 to the application server 270. The path segment 110B in FIG. 2 passes through a core network 240, a core network (CN) gateway 250, and a Packet Data Network (PDN) 260. The core network 240 is for example an Evolved Packet Core (EPC) or a Universal Mobile Telecommunications System (UMTS) packet core, while the CN gateway 250 is for example a PDN Gateway (PGW) or a Gateway GPRS Support Node (GGSN).

Figure 3:
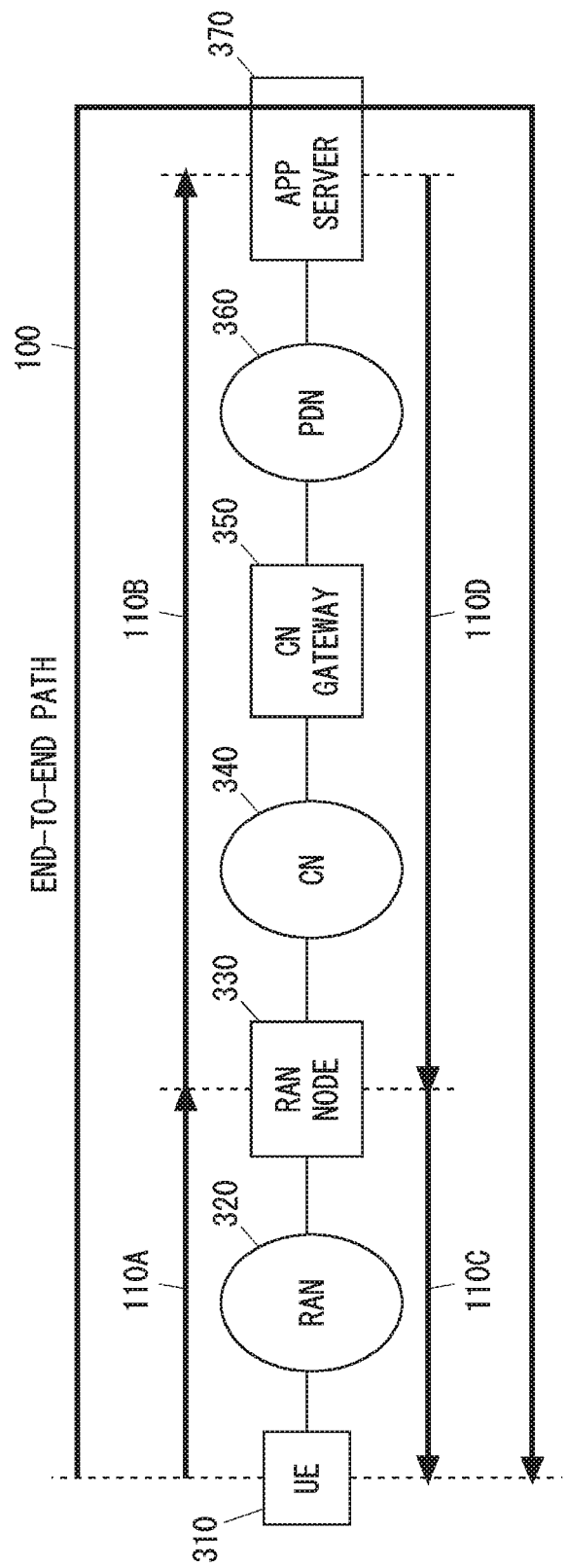
FIG. 3 shows an example of an end-to-end path.

In the example shown in FIG. 3, the end-to-end path 100 is a round-trip path that starts from a UE 310, passes through an application server 370, and returns to the UE 310. Accordingly, the UE 310 corresponds to both the (sender) end node 10 and the (receiver) end node 30.

The end-to-end path 100 shown in FIG. 3 is divided into four path segments 110A, 110B, 110C and 110D by a RAN node 330 and an application server 370. The path segment 110A in FIG. 3 is a communication path from a UE 310 to the RAN node 330 through a RAN 320 (i.e., an uplink air interface). The path segment 110B in FIG. 3 is a communication path from the RAN node 330 to the application server 370. The path segment 110C in FIG. 3 is a communication path from the application server 370 to the RAN node 330. The path segments 110B and 110C in FIG. 3 pass through a core network 340, a CN gateway 350, and a PDN 360. The path segment 110D in FIG. 3 is a communication path from the RAN node 330 to the UE 310 through the RAN 320 (i.e., a downlink air interface).

Figure 4:
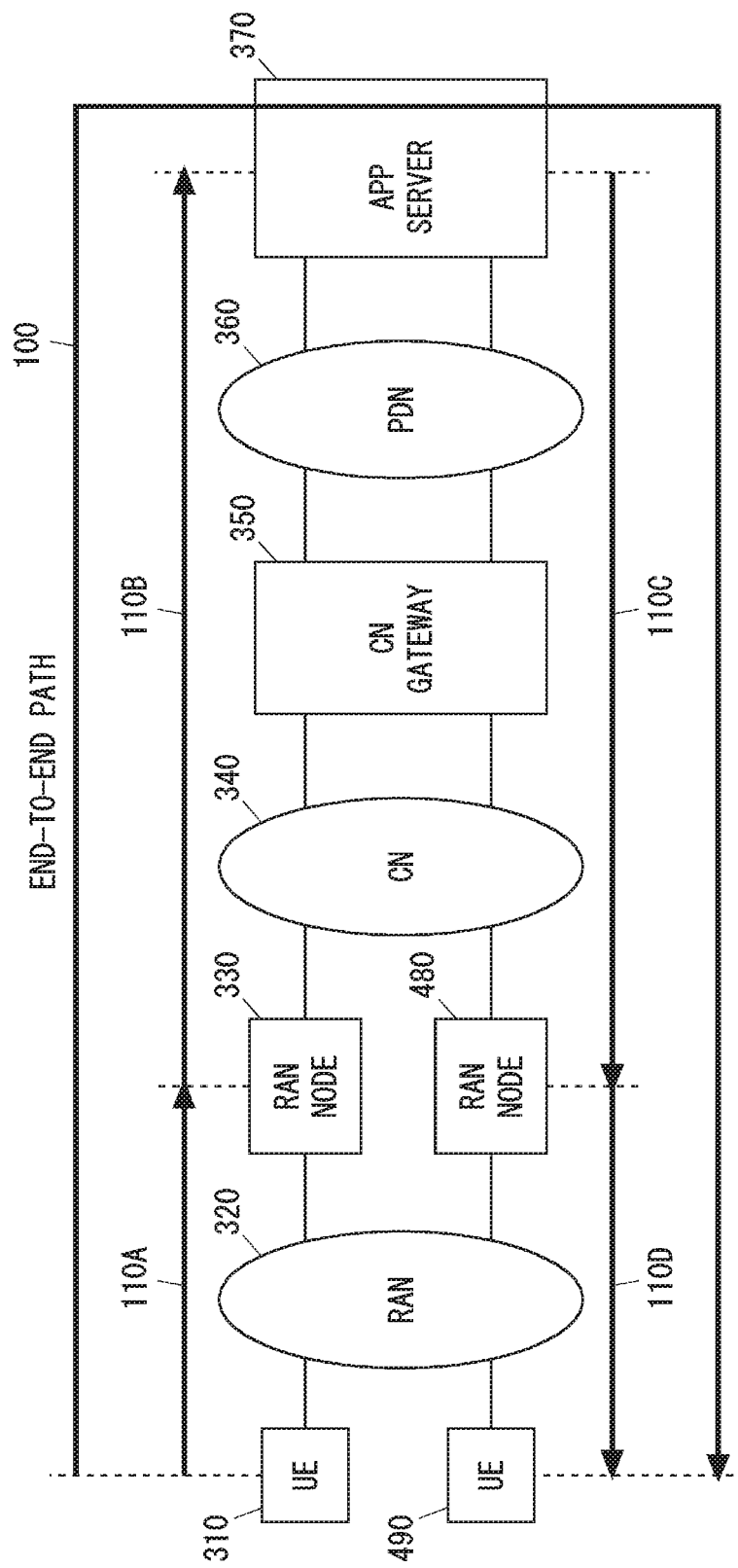
FIG. 4 shows an example of an end-to-end path.

The example shown in FIG. 4 is a modified example of the example shown in FIG. 3. That is, in the example shown in FIG. 4, the end-to-end path 100 starts from the UE 310, passes through the application server 370, and reaches a UE 490. Accordingly, the UE 310 corresponds to the (sender) end node 10 and the UE 490 corresponds to the (receiver) end node 30. The path segment 110C in FIG. 4 is a communication path from the application server 370 to a RAN node 480. The path segment 110D in FIG. 4 is a communication path from the RAN node 480 to the UE 490 through the RAN 320 (i.e., downlink air interface). The RAN node 480 may be identical to the RAN node 330.

Figure 5:
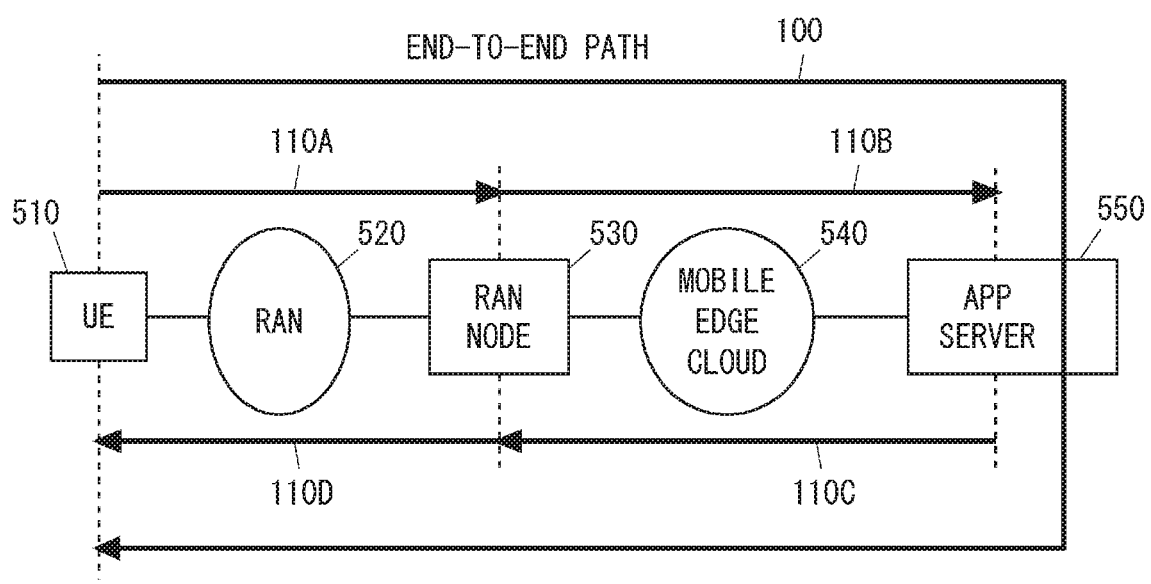
FIG. 5 shows an example of an end-to-end path.

The examples shown in FIG. 5 relates to Mobile Edge Computing (MEC). The MEC offers, to application developers and content providers, cloud-computing capabilities and an information technology (IT) service environment in the RAN in close proximity to mobile subscribers. This environment provides ultra-low latency and high bandwidth as well as direct access to radio network information (subscriber's location, cell load etc.) that can be leveraged by applications and services. The MEC is based on a virtualized platform, similar to Network Function Virtualization (NFV). While NFV focuses on network functions, MEC enables applications to be run at the edge of the network.

A mobile edge cloud 540 provides an application server 550 with computing resources, storage capacity, and an interface with a RAN. More specifically, the mobile edge cloud 540 provides a hosting environment for applications by providing Infrastructure as a Service (IaaS) facilities or Platform as a Service (PaaS) facilities. That is, the application server 550 may be an application (hereinafter referred to as an MEC application) hosted on a server (hereinafter referred to as an MEC server) in the mobile edge cloud 540. The mobile edge cloud 540 (or the MEC server) can also be referred to as an Internet of Things (IoT) service enabler.

The end-to-end path 100 shown in FIG. 5 is divided into four path segments 110A, 110B, 110C and 110D by a RAN node 530 and the application server 550. The path segment 110A in FIG. 5 is a communication path from a UE 510 to the RAN node 530 through a RAN 520 (i.e., an uplink air interface). The path segment 110B in FIG. 5 is a communication path from the RAN node 530 to the application server 550 arranged in the MEC environment. The path segment 110C in FIG. 5 is a communication path from the application server 55 to the RAN node 530. The path segments 110B and 110C in FIG. 5 pass through the mobile edge cloud 540. The path segment 110D in FIG. 5 is a communication path from the RAN node 530 to the UE 510 through the RAN 520 (i.e., a downlink air interface).

Referring back to FIG. 1, a controller 40 shown in FIG. 1 is a control apparatus configured to control a plurality of path segments forming an end-to-end path. In order to control each path segment 110, the controller 40 communicates with at least one node included in the path segment 110 or communicates with an entity that manages the path segment 110. For example, the controller 40 may communicate with the RAN node 230 to control the path segment 110A (i.e., a RAN segment) shown in FIG. 2. The controller 40 may communicate with at least one of the RAN node 230, the CN gateway 250, and the application server 270, to control the path segment 110B (i.e., a wired network segment) shown in FIG. 2. Additionally or alternatively, the controller 40 may communicate with a control entity (e.g., a Service Capability Exposure Function (SCEF) or a Policy and Charging Rules Function (PCRF)) in the core network 240 to control the path segment 110B shown in FIG. 2. That is, although respective connection relations between the controller 40 and the four nodes 10, 20A, 20B and 30 included in the end-to-end path 100 are shown in FIG. 1, the controller 40 may communicate only with some of these four nodes.

The controller 40 may be a single computer system or may be (distributed) computer systems. In some implementations, the controller 40 may be arranged in a core network (e.g., the core network 240 or 340) or may be arranged in a PDN (e.g., the PDN 260 or 360). For example, the controller 40 may be arranged in a control node (e.g., an SCEF) within the core network. In some implementations, the controller 40 may be arranged in the mobile edge cloud 540 (e.g., an MEC server or an IoT service enabler) shown in FIG. 5. In some implementations, the controller 40 may be arranged in one of the nodes included in the end-to-end path 100 (e.g., the end node 10, one of the intermediate nodes 20, or the end node 30).

Figure 6:
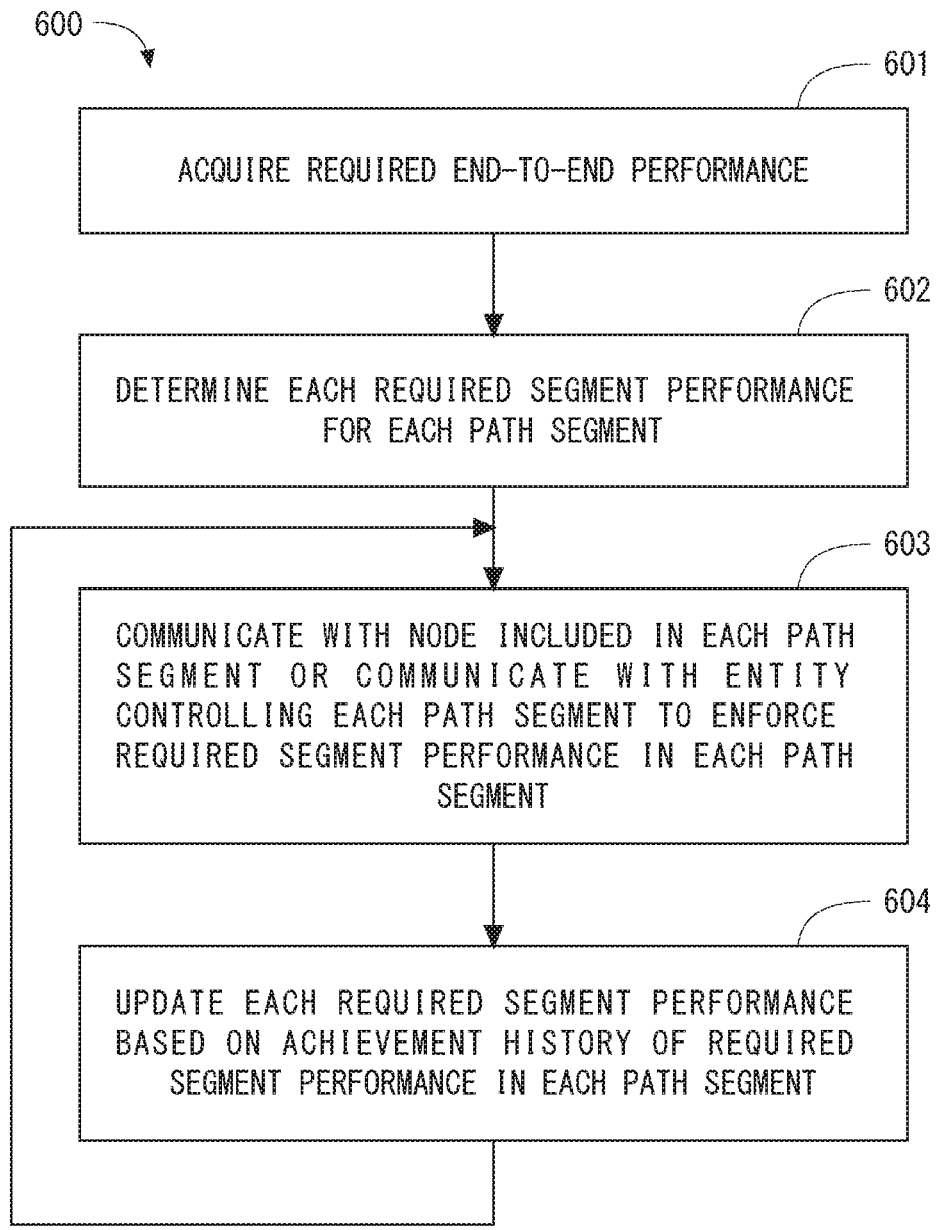
FIG. 6 is a flowchart showing an example of operations performed by a control apparatus according to the first embodiment.

The following describes operations performed by the controller 40 with reference to FIG. 6. FIG. 6 is a flowchart showing a process 600 that is an example of operations performed by the controller 40. In Step 601, the controller 40 acquires a required end-to-end performance required for the end-to-end path 100. The required end-to-end performance may be acceptable end-to-end latency (i.e., an acceptable delay budget, e.g., 1 millisecond, 10 milliseconds, or 100 milliseconds). Alternatively, the required end-to-end performance may be end-to-end throughput.

In some implementations, the controller 40 may read a value of the required end-to-end performance stored in a memory or a storage. Alternatively, the controller 40 may communicate with a subscriber information management server (e.g., a Home Subscriber Server (HSS)) and acquire a value of the required end-to-end performance from the subscriber information management server. Alternatively, the controller 40 may acquire a value of the required end-to-end performance from the end node 10 (e.g., the UE 210, 310 or 510), from the end node 30 (e.g., the application server 270 or the UE 490), or from one of the intermediate nodes 20 (e.g., the application server 370 or 550). Alternatively, the controller 40 may acquire a value of the required end-to-end performance from another server (e.g., the mobile edge cloud 540).

In Step 602, the controller 40 determines respective required segment performances required for the path segments 110 based on the required end-to-end performance. Each required segment performance may be a delay target (e.g., 0.5 milliseconds, 1 millisecond, or 10 milliseconds) for each path segment 110. The delay target for each path segment 110 can also be referred to as an acceptable (segment) delay or an acceptable maximum (segment) delay. Alternatively, each required segment performance may be a throughput target for each path segment 110.

The controller 40 may acquire other parameters needed to calculate each required segment performance from a memory or another node. These other parameters may include, for example, the size of data to be sent in one communication event in each path segment and the maximum throughput of each path segment. The controller 40 may acquire these other parameters along with the required end-to-end performance in Step 601.

In Step 603, the controller 40 communicates with a node included in each path segment 110 or communicates with an entity controlling the path segment 110 to enforce a corresponding one of the required segment performances in the path segment 110. In other words, the controller 40 requests or instructs a node (or an entity) related to each path segment 110 to enforce the corresponding required segment performance in this path segment 110. The enforcement of the required segment performance affects, for example, one or both of packet scheduling and packet queuing performed by one of the end nodes and the intermediate nodes (e.g., a UE, a RAN node, a gateway, or a router). In order to achieve the enforced required segment performance, the end node or the intermediate node controls the treatment (e.g., priority) in one or both of the scheduling and the queuing of a packet flow related to the corresponding path segment or another packet flow.

For example, a RAN node (e.g., radio base station, eNodeB, or RNC) has a MAC scheduler that performs packet scheduling (i.e., Medium Access Control (MAC) scheduling). In some implementations, the MAC scheduler uses a scheduling metric based on the Earliest Deadline First (EDF) approach (i.e., EDF metric). The EDF metric is in proportion to the reciprocal of the difference between the delay threshold and the head of line delay. The head of line delay means a delay of the first packet of user's pending packets to be transmitted. In order to achieve the enforced required segment performance, the MAC scheduler may change the delay threshold used for the calculation of the EDF metric for a packet flow related to the corresponding path segment or another packet flow.

For example, a gateway (e.g., PGW or SGSN) and an IP router may control the treatment (e.g., priority) in one or both of classification and scheduling for a packet flow related to the path segment or another packet flow so as to achieve the enforced required segment performance. In some implementations, the gateway and the IP router may change a class of a packet flow related to the path segment in order to increase the priority of the packet flow. Additionally or alternatively, the gateway and the IP router may change a Weight Fair Queuing (WFQ) weight applied to a queue that the packet flow related to the path segment is to be stored in.

In Step 604, the controller 40 updates the required segment performance currently enforced in at least one path segment based on an achievement status of each of the required segment performances in the respective path segments 110. For example, the controller 40 may relax a new required segment performance for a path segment 110 that has not been able to achieve the currently enforced required segment performance. Additionally or alternatively, the controller 40 may tighten a new required segment performance for a path segment 110 that has achieved the currently enforced required segment performance.

More specifically, the controller 40 may operate as follows. Firstly, the controller 40 relaxes a new required segment performance (e.g., increases an acceptable segment delay) for a path segment 110 that has not been able to achieve the currently enforced required segment performance. Next, in order to compensate for the insufficient performance (e.g., the increase in delay) caused by the relaxation of the required segment performance, the controller 40 tightens a new required segment performance (e.g., reduces an acceptable segment delay) for another path segment 110.

In Step 604, the controller 40 may acquire a monitored performance parameter of each of the path segments 110 and determine whether each of the required segment performances has been achieved based on the acquired performance parameter. The performance parameter may be, for example, effective throughput or a measured value of a time required to transmit unit data.

The controller 40 repeats Steps 603 and 604, thereby dynamically adjusting each required segment performance based on the achievement status of each required segment performance. The controller 40 thus can contribute to guaranteeing the required end-to-end performance even when quality of each path segment 110 changes.

The following describes an example of a detailed algorithm performed in Steps 602 and 604 in FIG. 6. In this example, the required end-to-end performance is an end-to-end delay budget and the required segment performance for each path segment is an acceptable segment delay. Parameters shown below are used:

Required end-to-end performance: End-to-end delay budget (E2E_Delay_Budget);
Required segment performance for i-th path segment: Acceptable segment delay (Max_Delay_i);
The Size of data to be sent in i-th path segment in one communication event: Data_Size_i;
The Maximum achievable throughput of i-th path segment: Achievable_Throughput_i;
Monitored effective throughput of i-th path segment: Effective_Throughput_i;
Relief factor for i-th path segment: Relief_Factor_i;
Increment of the relief factor: Delta_Increment;
Decrement of the relief factor: Delta_Decrement; and
The Maximum value of the relief factor: Max_Relief_Factor.

In Step 602 in FIG. 6, the controller 40 determines the initial value of the acceptable segment delay of each path segment 110 according to the following Expression (1):

$$\mathrm{Max\_Delay\_}i = \frac{\frac{\mathrm{Data\_Size\_}i}{\mathrm{Achievable\_Throughput\_}i}}{\sum\limits_{x=1}^{n} \frac{\mathrm{Data\_Size\_}x}{\mathrm{Achievable\_Throughput\_}x}} \cdot E2E\_Delay\_Budget \qquad (1)$$

The maximum achievable throughput of each path segment may be acquired from each node. The maximum achievable throughput of each path segment may be derived from a parameter reported from each node. For example, the maximum achievable throughput of a RAN segment may be derived from a Channel Quality Indicator (CQI) value of the UE (e.g., the UE 210) and the total throughput of the RAN node. In order to obtain the maximum throughput (hereinafter referred to as the first maximum throughput) from the CQI value of the UE, the controller 40 may refer to a table in which a relation between CQI values and the maximum throughput that can be achieved when all the radio resources (e.g., all the resource blocks) of the RAN node are used. However, when the first throughput exceeds the maximum achievable throughput that can be achieved by the remaining resources of the RAN node (hereinafter referred to as the second maximum throughput), the controller 40 may use the second maximum throughput instead of the first maximum throughput. The second maximum throughput may be obtained by subtracting the sum of throughputs of UEs currently connected to the RAN node from the total throughput of the RAN node. The sum of throughputs of UEs currently connected to the RAN node may be a value that is obtained by multiplying the number of UEs currently connected to the RAN node by the maximum throughput corresponding to an average CQI value of these UEs.

By using the Expression (1), even when the respective sizes of data to be transmitted in the path segments differ from one another, the acceptable segment delays according to the respective sizes of data to be transmitted can be assigned to the path segments in an equitable manner.

Further, the acceptable segment delays according to the respective maximum achievable throughputs of the path segments can be assigned to the path segments.

In Step 604 in FIG. 6, the controller 40 determines whether the following Expression (2) is satisfied based on the observed effective throughput of each path segment i20:

$$\frac{\text{Data\_Size}\_i}{\text{Effective\_Throughput}\_i} \le \text{Max\_Delay}\_i. \quad (2)$$

When the Expression (2) is satisfied for the i-th path segment, the controller 40 determines that the required segment performance currently enforced in this path segment has been achieved. On the other hand, when the Expression (2) is not satisfied for the i-th path segment, the controller 40 determines that the required segment performance currently enforced in this path segment has not been achieved.

Further, in Step 604 in FIG. 6, the controller 40 adds the decrement Delta_Decrement to the relief factor Relief_Factor_i of an inappropriate path segment that has been determined not to have achieved the current required segment performance. However, the value of the relief factor Relief_Factor_i should not be greater than the maximum value Max_Relief_Factor. Then, the controller 40 obtains a new required segment performance (i.e., acceptable segment delay) of the inappropriate path segment according to the following Expression (3):

$$\text{New\_Max\_Delay}\_i = \text{Current\_Max\_Delay}\_i \cdot \text{Relief\_Factor}\_i \quad (3).$$

Meanwhile, the controller 40 determines a new required segment performance (i.e., acceptable segment delay) of an appropriate path segment that has been determined to have achieved the current required segment performance according to the following Expression (4):

$$\text{New\_Max\_Delay}\_i = \text{Current\_Max\_Delay}\_i - \frac{\text{Total\_added\_delay}}{\text{N\_inappropriate\_segments}}, \quad (4)$$

where, "N_inappropriate_segments" is the total number of inappropriate path segments that have been determined not to have achieved their respective current required segment performances, and "Total_exempted_delay" is the sum of acceptable segment delays which have been added to these inappropriate path segments (i.e., by which they have been relaxed) according to the Expression (3).

By using the Expression (3), the controller 40 can relax a new required segment performance (i.e., increase an acceptable segment delay) for a path segment 110 that has not been able to achieve the currently enforced required segment performance. Further, by using the Expression (4), the controller 40 can tighten a new required segment performance (i.e., reduce an acceptable segment delays) for other path segments 110 so as to compensate for the insufficient performance (e.g., the increase in delay) caused by the relaxation of the required segment performance.

Second Embodiment

This embodiment provides a modified example of the procedure for updating a required segment performance described in the first embodiment. Configuration examples of a communication network according to this embodiment are similar to those shown in FIGS. 1 to 5.

The controller 40 according to this embodiment performs the procedure for updating a required segment performance in Step 604 in FIG. 6 as follows. When the difference between the currently enforced required segment performance and the new required segment performance exceeds a threshold, the controller 40 enforces the new required segment performance in the corresponding path segment 110. On the other hand, when the difference does not exceed the threshold, the controller 40 refrains from enforcing the new required segment performance in the corresponding path segment 110.

Frequent updating of the required segment performance may cause an increase in the load on each node (e.g., an end node or an intermediate node). The controller 40 according to this embodiment refrains from updating the required segment performance when the difference between the currently enforced required segment performance and the new required segment performance is smaller than the threshold. Accordingly, the controller 40 according to this embodiment can contribute to preventing the load on each node from increasing due to the frequent updating of the required segment performance.

Third Embodiment

The procedure for updating a required segment performance described in the above embodiments may be modified as appropriate. This embodiment provides several modified examples of the procedure for updating a required segment performance. Configuration examples of a communication network according to this embodiment are similar to those shown in FIGS. 1 to 5.

For example, the controller 40 may just tighten a new required segment performance for a path segment 110 that has achieved the currently enforced required segment performance without relaxing a new required segment performance for a path segment 110 that has not been able to achieve the currently enforced required segment performance.

Additionally or alternatively, the controller 40 may update a required segment performance of a RAN segment as follows. When a required segment performance for a RAN segment of a certain UE (hereinafter referred to as the first UE) has not been achieved, the controller 40 may relax a required segment performance for a RAN segment of another UE (hereinafter referred to as the second UE) that is connected to the RAN node to which the first UE is also connected. It is expected that radio resources that can be allocated to the first UE will increase by relaxing the required segment performance of the second UE (e.g., increasing the delay target (the acceptable delay) or lowering the throughput target). The above-described operation thus can expedite (or facilitate) the achievement of the required segment performance (e.g., the delay target (the acceptable delay) or the throughput target) for the RAN segment of the first UE.

Similarly, the controller 40 may update a required segment performance of a wired network segment as follows. When a required segment performance for a wired network segment of a certain UE (hereinafter referred to as the first UE) has not been achieved, the controller 40 may relax a required segment performance for a wired network segment of another UE (hereinafter referred to as the second UE). It is expected that processing resources that can be used for a packet flow of the first UE will increase by relaxing the required segment performance of the second UE (e.g., increasing the delay target (the acceptable delay) or lowering the throughput target). Alternatively, it is expected that the priority of the packet flow of the first UE will relatively goes up. The above-described operation thus can expedite (or facilitate) the achievement of the required segment performance (e.g., the delay target (the acceptable delay) or the throughput target) for the wired network segment of the first UE.

Fourth Embodiment

This embodiment provides several examples of network resource allocation performed by an intermediate node 20 (e.g., a RAN node or a gateway). Configuration examples of a communication network according to this embodiment are similar to those shown in FIGS. 1 to 5.

Allocation of network resources (e.g., radio resources or communication bandwidth) to a plurality of radio terminals (UEs) is described hereinafter. The intermediate node 20, which performs network resource allocation, reduces resources allocated to a first UE(s) and then allocates the surplus resources obtained by the reduction to a second UE(s). The first UE(s) is a UE(s) that has been allocated resources larger than those required to achieve the required segment performance (e.g., the delay target or the throughput target) determined by the controller 40. Meanwhile, the second UE(s) is a UE(s) that has been allocated resources smaller than those required to achieve the required segment performance.

In other words, the intermediate node 20 compares an amount of resources allocated to each UE with an amount of resources needed to achieve the required segment performance for this UE, and determines whether the amount of resources allocated to each UE is appropriate, excessive, or insufficient. Then, the intermediate node 20 takes away the surplus (or excess) resources from a UE(s) having them and allocates these resources to a UE(s) that does not have sufficient resources. In this way, the intermediate node 20 reduces the number of UEs having surplus (or excess) resources and the number of UEs that do not have sufficient resources. The intermediate node 20 thus increases the number of UEs that have been allocated appropriate amounts of resources necessary and enough to achieve the required segment performance as much as possible.

When there is a UE(s) that does not have sufficient resources even after performing the above-described step, the intermediate node 20 may re-allocate bandwidth that has been allocated to one or more UEs for which the shortage of resources is relatively large to one or more UEs for which the shortage of resources is relatively small. That is, the intermediate node 20 preferentially helps UEs having a relatively small shortage of resources over UEs having a relatively large shortage of resources, in order to increase the number of UEs that can achieve their respective required segment performances (e.g., the delay targets or the throughput targets) as much as possible, When there is a UE(s) that does not have sufficient resources even after performing the above two steps, the intermediate node 20 may allocate resources to this UE(s) in a best effort manner.

As understood from the above description, the method for allocating network resources according to this embodiment can contribute to increasing the number of UEs that have been allocated appropriate resources necessary and enough to achieve their required segment performances as much as possible. In other words, the method for allocating network resources according to this embodiment can contribute to increasing the number of UEs that can achieve their required segment performances.

Fifth Embodiment

This embodiment provides a modified example of operations performed by the controller 40. Configuration examples of a communication network according to this embodiment are similar to those shown in FIGS. 1 to 5.

The controller 40 according to this embodiment monitors a traffic-related parameter. The traffic-related parameter affects the determination of at least one required segment performance for achieving the required end-to-end performance. The traffic-related parameter may be, for example, the size of data to be sent in one communication event in each path segment 110. Additionally or alternatively, the traffic-related parameter may include at least one of a data rate per communication event and an interval between communications in the communication event. That is, the traffic-related parameter may be a parameter that relates to the pattern of a traffic flow and changes as the transmission data size or the data rate per communication event changes.

In some implementations, the controller 40 may acquire a configured or measured value of the traffic-related parameter from the end node 10 or 30. Additionally or alternatively, the controller 40 may acquire a measured value of the traffic-related parameter from at least one intermediate node 20 that takes part in the transfer of the traffic flow. Additionally or alternatively, the controller 40 may acquire a configured or measured value of the traffic-related parameter from another control entity.

In addition, the controller 40 according to this embodiment updates a required segment performance for each path segment 110 that is affected by a change in the traffic-related parameter in order to compensate for the change in the traffic-related parameter.

The controller 40 thus can compensate for the change in the traffic-related parameter and hence contribute to stabilizing control of each path segment to achieve the required end-to-end performance.

Sixth Embodiment

This embodiment provides a modified example of operations performed by the intermediate node 20. Configuration examples of a communication network according to this embodiment are similar to those shown in FIGS. 1 to 5.

The controller 40 according to this embodiment monitors a traffic-related parameter. The definition of the traffic-related parameter is similar to that described in the fifth embodiment. In some implementations, the intermediate node 20 may acquire a configured or measured value of the traffic-related parameter from the end node 10 or 30. Additionally or alternatively, the intermediate node 20 may measure the traffic-related parameter by itself.

Further, the intermediate node 20 according to this embodiment updates a required segment performance for each path segment 110 that is affected by a change in the traffic-related parameter in order to compensate for the change in the traffic-related parameter.

The intermediate node 20 thus can compensate for the change in the traffic-related parameter and hence contribute to stabilizing control of each path segment in order to achieve the required end-to-end performance.

Figure 7:
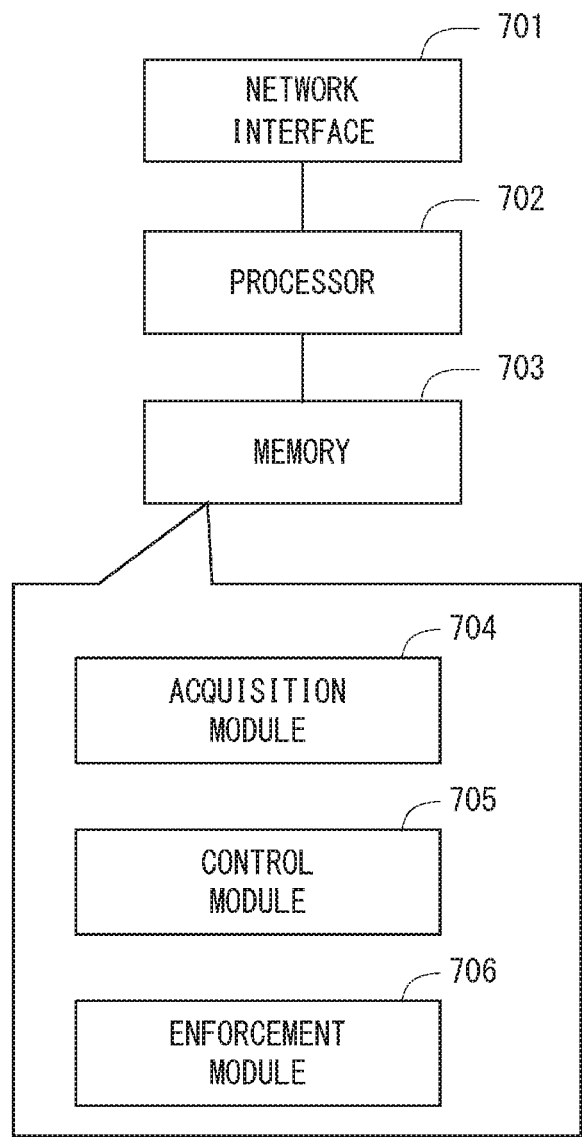
FIG. 7 is a block diagram showing a configuration example of a control apparatus.

Lastly, configuration examples of the controller 40 and the intermediate node 20 according to the above embodiments will be described. FIG. 7 is a block diagram showing a configuration example of the controller 40. Referring to FIG. 7, the controller 40 includes a network interface 701, a processor 702, and a memory 703. The network interface 701 is used to communicate with network entities (e.g., end nodes, intermediate nodes, a UE, a RAN node, a CN node, and an application server). The network interface 701 may include, for example, a network interface card (NIC) conforming to the IEEE 802.3 series.

The processor 702 loads software (computer program(s)) from the memory 703 and executes the loaded software, thereby performing processing of the controller 40 described in the above embodiments. The processor 702 may be, for example, a microprocessor, an MPU, or a CPU. The processor 702 may include a plurality of processors.

The memory 703 is composed of a volatile memory and a nonvolatile memory. The memory 703 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 703 may include a storage located apart from the processor 702. In this case, the processor 702 may access the memory 703 through an I/O interface (not shown).

In the example shown in FIG. 7, the memory 703 is used to store software modules including an acquisition module 704, a control module 705, and an enforcement module 706. The processor 702 loads the software module from the memory 703 and executes the loaded software module, thereby performing the processing of the controller 40 described by in the above embodiments.

The processor 702 can load and execute the acquisition module 704, thereby performing, for example, the processing in Step 601 in FIG. 6. The processor 702 can load and execute the control module 705, thereby performing, for example, the processing in Steps 602 and 604 in FIG. 6. The processor 702 can load and execute the enforcement module 706, thereby performing, for example, the processing in Step 603 in FIG. 6.

Figure 8:
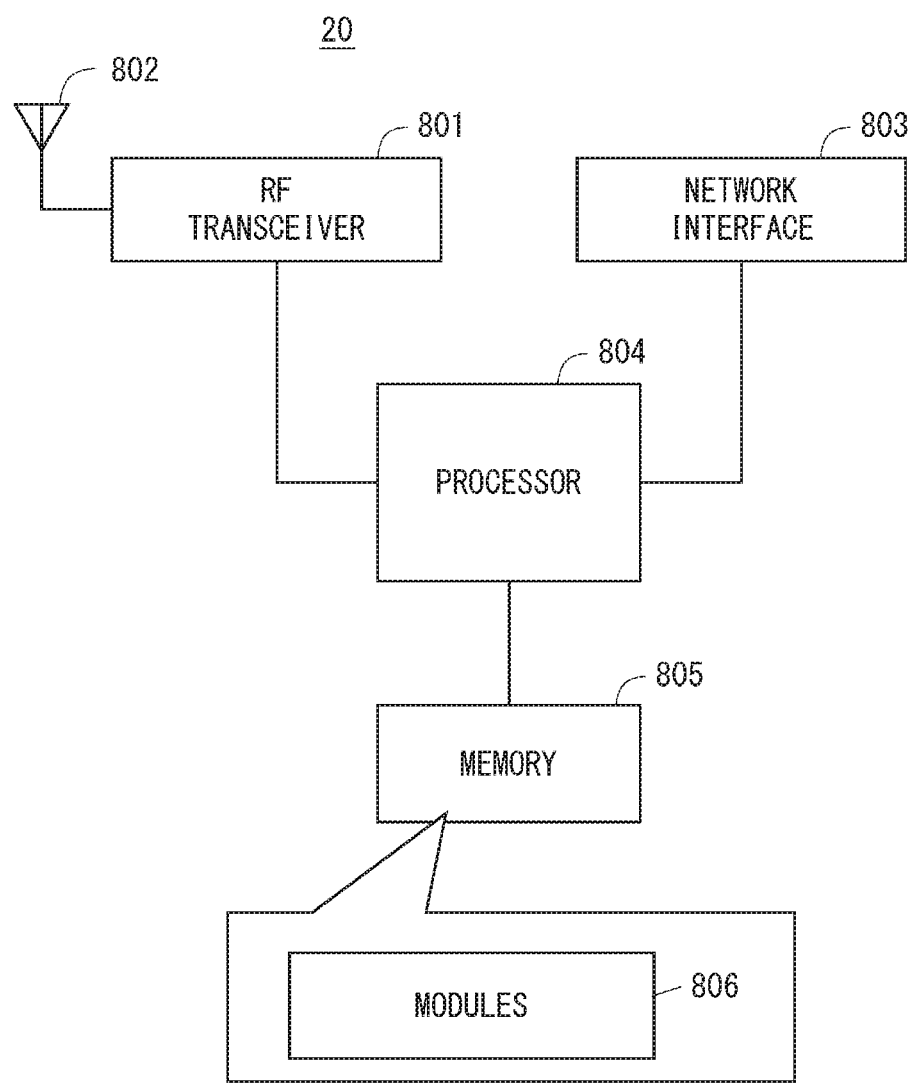
FIG. 8 is a block diagram showing a configuration example of an intermediate node.

FIG. 8 is a block diagram showing a configuration example of the intermediate node 20 according to the above embodiments. In the example shown in FIG. 8, the intermediate node 20 is an RAN node. Referring to FIG. 8, the intermediate node 20 includes an RF transceiver 801, a network interface 803, a processor 804, and a memory 805. The RF transceiver 801 performs analog RF signal processing to communicate with the UE 1. The RF transceiver 801 may include a plurality of transceivers. The RF transceiver 801 is connected to an antenna 802 and the processor 804. In some implementations, the RF transceiver 801 receives modulated symbol data (or OFDM symbol data) from the processor 804, generates a transmission RF signal, and supplies the generated transmission RF signal to the antenna 802. Further, the RF transceiver 801 generates a baseband reception signal based on a reception RF signal received by the antenna 802 and supplies this signal to the processor 804.

The network interface 803 is used to communicate with a network node (e.g., a MME or an S/P-GW) and the controller 40. The network interface 803 may include, for example, a network interface card (NIC) conforming to the IEEE 802.3 series.

The processor 804 performs digital baseband signal processing (i.e., data-plane processing) and control-plane processing for radio communication. For example, in the case of LTE or LTE-Advanced, the digital baseband signal processing performed by the processor 804 may include signal processing of the PDCP layer, RLC layer, MAC layer, and PHY layer. Further, the control-plane processing performed by the processor 804 may include processing of the Si protocol, RRC protocol, and MAC CEs.

The processor 804 may include a plurality of processors. For example, the processor 804 may include a modem-processor (e.g., DSP) that performs the digital baseband signal processing, and a protocol-stack-processor (e.g., CPU or MPU) that performs the control-plane processing.

The memory 805 is composed of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 805 may include a storage located apart from the processor 804. In this case, the processor 804 may access the memory 805 through the network interface 803 or an I/O interface (not shown).

The memory 805 may store one or more software modules (or computer programs) including instructions and data to perform processing by the intermediate node 20 described in the above embodiments. In some implementations, the processor 804 may be configured to load the software module from the memory 805 and execute the loaded software module, thereby performing the processing of the intermediate node 20 described in the above embodiments with reference to the drawings.

In the example shown in FIG. 8, the memory 805 is used to store one or more software modules 806. The one or more software modules 806 include instructions and data for performing the processing by the intermediate node 20 described in the above embodiments. The processor 802 can load these software modules 806 from the memory 803 and execute the loaded software modules, thereby performing the processing of the intermediate node 20 described in the above embodiments.

As described above with reference to FIGS. 7 and 8, each of the processors included in the controller 40 and the intermediate node 20 in the above embodiment may be configured to execute one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

OTHER EMBODIMENTS

Each of the above embodiments may be used individually, or two or more of the embodiments may be appropriately combined with one another.

Further, the above-described embodiments are merely examples of applications of the technical ideas obtained by the inventor. These technical ideas are not limited to the above-described embodiments and various modifications can be made thereto.

The whole or part of the embodiments disclosed above can be described as, but not limited to, the following supplementary notes.

(Supplementary Note 1)

A control apparatus comprising:

a memory; and at least one processor coupled to the memory and configured to execute a plurality of modules, the plurality of modules comprising:

an acquisition module configured to acquire a required end-to-end performance required for an end-to-end path from a first end node to a second end node, the end-to-end path including the first and second end nodes and at least one intermediate node, the end-to-end path including a plurality of path segments;

a control module configured to determine each required segment performance required for a respective one of the path segments based on the required end-to-end performance; and an enforcement module configured to communicate with a node included in each path segment or communicate with an entity controlling the path segment to enforce a corresponding one of the required segment performances in the path segment, and wherein the control module is further configured to update a required segment performance currently enforced in at least one path segment based on an achievement status of each of the required segment performances in the respective path segments.

(Supplementary Note 2)

The control apparatus described in Supplementary note 1, wherein the control module is configured to perform one or both of:

relaxing a new required segment performance for a path segment that has not been able to achieve a currently enforced required segment performance therein; and tightening a new required segment performance for a path segment that has achieved a currently enforced required segment performance therein.

(Supplementary Note 3)

The control apparatus described in Supplementary note 1 or 2, wherein the control module is configured to:

when a difference between a currently enforced required segment performance and a new required segment performance exceeds a threshold, enforce the new required segment performance in a corresponding one of the path segments through the enforcement module; and when the difference does not exceed the threshold, refrain from enforcing the new required segment performance.

(Supplementary Note 4)

The control apparatus described in any one of Supplementary notes 1 to 3, wherein the control module is further configured to determine whether each of the required segment performances has been achieved based on a monitored performance parameter of a respective one of the path segments.

(Supplementary Note 5)

The control apparatus described in any one of Supplementary notes 1 to 4, wherein at least one of the first and second end nodes is a radio terminal, the at least one intermediate node includes a base station, and at least one of the path segments is a radio access network segment between the radio terminal and the base station.

(Supplementary Note 6)

The control apparatus described in Supplementary note 5, wherein the first and second end nodes are the same radio terminal, and the end-to-end path is a round-trip path.

(Supplementary Note 7)

The control apparatus described in Supplementary note 5 or 6, wherein the enforcement module is configured to communicate with the base station to enforce a corresponding one of the required segment performances in the radio access network segment.

(Supplementary Note 8)

The control apparatus described in any one of Supplementary notes 1 to 7, wherein the end-to-end performance relates to an acceptable delay for the end-to-end path, and each of the required segment performances relates to an acceptable delay for a respective one of the path segments.

(Supplementary Note 9)

A method performed by a control apparatus, the method comprising:

acquiring a required end-to-end performance required for an end-to-end path from a first end node to a second end node, the end-to-end path including the first and second end nodes and at least one intermediate node, the end-to-end path including a plurality of path segments;

determining each required segment performance required for a respective one of the path segments based on the required end-to-end performance;

communicating with a node included in each path segment or communicating with an entity controlling the path segment to enforce a corresponding one of the required segment performances in the path segment; and updating a required segment performance currently enforced in at least one path segment based on an achievement status of each of the required segment performances in the respective path segments.

(Supplementary Note 10)

The method described in Supplementary note 9, wherein the updating comprises one or both of:

relaxing a new required segment performance for a path segment that has not been able to achieve a currently enforced required segment performance therein; and tightening a new required segment performance for a path segment that has achieved a currently enforced required segment performance therein.

(Supplementary Note 11)

The method described in Supplementary note 9 or 10, wherein the updating comprises:

when a difference between a currently enforced required segment performance and a new required segment performance exceeds a threshold, enforcing the new required segment performance in a corresponding one of the path segments; and when the difference does not exceed the threshold, refraining from enforcing the new required segment performance.

(Supplementary Note 12)

The method described in any one of Supplementary notes 9 to 11, further comprising determining whether each of the required segment performances has been achieved based on a monitored performance parameter of a respective one of the path segments.

(Supplementary Note 13)

The method described in any one of Supplementary notes 9 to 12, wherein at least one of the first and second end nodes is a radio terminal, the at least one intermediate node includes a base station, and at least one of the path segments is a radio access network segment between the radio terminal and the base station.

(Supplementary Note 14)

The method described in Supplementary note 13, wherein the first and second end nodes are the same radio terminal, and the end-to-end path is a round-trip path.

(Supplementary Note 15)

The method described in Supplementary note 13 or 14, wherein the enforcing comprises communicating with the base station to enforce a corresponding one of the required segment performances in the radio access network segment.

(Supplementary Note 16)

The method described in any one of Supplementary notes 9 to 15, wherein the end-to-end performance relates to an acceptable delay for the end-to-end path, and each of the required segment performances relates to an acceptable delay for a respective one of the path segments.

(Supplementary Note 17)

A program for causing a computer to perform a method performed by a control apparatus, the method comprising:

acquiring a required end-to-end performance required for an end-to-end path from a first end node to a second end node, the end-to-end path including the first and second end nodes and at least one intermediate node, the end-to-end path including a plurality of path segments;

determining each required segment performance required for a respective one of the path segments based on the required end-to-end performance;

communicating with a node included in each path segment or communicating with an entity controlling the path segment to enforce a corresponding one of the required segment performances in the path segment, and updating a required segment performance currently enforced in at least one path segment based on an achievement status of each of the required segment performances in the respective path segments.

REFERENCE SIGNS LIST

10 END NODE
20 INTERMEDIATE NODE
30 END NODE
40 CONTROLLER
702 PROCESSOR
703 MEMORY
704 ACQUISITION MODULE
705 CONTROL MODULE
706 ENFORCEMENT MODULE

The invention claimed is:

1. A control apparatus comprising:
one or more memories storing instructions; and
one or more processors configured to execute the instructions to implement:
an acquisition module configured to acquire a required end-to-end performance required for an end-to-end path from a first end node to a second end node, the end-to-end path including the first and second end nodes and at least one intermediate node, the end-to-end path including a plurality of path segments, the required end-to-end performance comprising both of an acceptable end-to-end delay for the end-to-end path and an end-to-end throughput target of the end-to-end path;
a control module configured to determine each required segment performance required for a respective one of the path segments based on the required end-to-end performance, the required segment performance comprising both of an acceptable segment delay for the corresponding path segment and a throughput target for the corresponding path segment; and
an enforcement module configured to communicate with a node included in each path segment or communicate with an entity controlling the path segment to enforce a corresponding one of the required segment performances in the path segment,
wherein the control module is configured to:
identify a first path segment from among the plurality of path segments that has not been able to achieve a currently enforced first path required segment performance enforced on the first path segment;
identify a second path segment from among the plurality of path segments that has been able to achieve a currently enforced second path required segment performance enforced on the second path segment;
relax the currently enforced first path required segment performance enforced on the first path segment to a new first path required segment performance to be enforced on the first path segment by increasing the acceptable segment delay for the first path segment or decreasing the throughput target for the first path segment; and
tighten the currently enforced second path required segment performance enforced on the second path segment to a new second path required segment performance to be enforced on the second path segment by decreasing the acceptable segment delay for the second path segment or increasing the throughput target for the second path segment.

2. The control apparatus according to claim 1, wherein the control module is configured to:
when a difference between a currently enforced required segment performance and a new required segment performance exceeds a threshold, enforce the new required segment performance in a corresponding one of the path segments through the enforcement module; and
when the difference does not exceed the threshold, refrain from enforcing the new required segment performance.

3. The control apparatus according to claim 1, wherein the control module is further configured to determine whether each of the required segment performances has been achieved based on a monitored performance parameter of a respective one of the path segments.

4. The control apparatus according to claim 1, wherein
at least one of the first and second end nodes is a radio terminal,
the at least one intermediate node includes a base station, and
at least one of the path segments is a radio access network segment between the radio terminal and the base station.

5. The control apparatus according to claim 4, wherein
the first and second end nodes are the same radio terminal, and
the end-to-end path is a round-trip path.

6. The control apparatus according to claim 4, wherein the enforcement module is configured to communicate with the base station to enforce a corresponding one of the required segment performances in the radio access network segment.

7. The control apparatus according to claim 1, wherein the control module is configured to:
- obtain a first monitored performance parameter from a first intermediate node among the at least one intermediate node;
- obtain a second monitored performance parameter from a second intermediate node among the at least one intermediate node; and
- identify the first path segment that has not been able to achieve the currently enforced first path required segment performance and the second path segment from among the plurality of path segments that has been able to achieve the currently enforced second path required segment performance based on the first monitored performance parameter and the second monitored performance parameter.

8. The control apparatus according to claim 1, wherein the enforcement module is further configured to enforce the new first path required segment performance and the new second path required segment performance by controlling one or both of packet scheduling and packet queuing performed by one of the end nodes and the at least one intermediate node.

9. The control apparatus according to claim 1, wherein the enforcement module is further configured to enforce the new first path required segment performance and the new second path required segment performance by changing a delay threshold used for calculation of an Earliest Deadline First (EDF) metric for a first packet flow related to the new first path required segment performance and a second packet flow related to the new second path required segment performance.

10. A method performed by a control apparatus, the method comprising:
- acquiring a required end-to-end performance required for an end-to-end path from a first end node to a second end node, the end-to-end path including the first and second end nodes and at least one intermediate node, the end-to-end path including a plurality of path segments, the required end-to-end performance comprising both of an acceptable end-to-end delay for the end-to-end path and an end-to-end throughput target of the end-to-end path;
- determining each required segment performance required for a respective one of the path segments based on the required end-to-end performance, the required segment performance comprising both of an acceptable segment delay for the corresponding path segment and a throughput target for the corresponding path segment;
- communicating with a node included in each path segment or communicating with an entity controlling the path segment to enforce a corresponding one of the required segment performances in the path segment; and
- identifying a first path segment from among the plurality of path segments that has not been able to achieve a currently enforced first path required segment performance enforced on the first path segment;
- identifying a second path segment from among the plurality of path segments that has been able to achieve a currently enforced second path required segment performance enforced on the second path segment;
- relaxing the currently enforced first path required segment performance enforced on the first path segment to a new first path required segment performance to be enforced on the first path segment by increasing the acceptable segment delay for the first path segment or decreasing the throughput target for the first path segment; and
- tightening the currently enforced second path required segment performance enforced on the second path segment to a new second path required segment performance to be enforced on the second path segment by decreasing the acceptable segment delay for the second path segment or increasing the throughput target for the second path segment.

11. The method according to claim 10, wherein the updating comprises:
- when a difference between a currently enforced required segment performance and a new required segment performance exceeds a threshold, enforcing the new required segment performance in a corresponding one of the path segments; and
- when the difference does not exceed the threshold, refraining from enforcing the new required segment performance.

12. The method according to claim 10, further comprising determining whether each of the required segment performances has been achieved based on a monitored performance parameter of a respective one of the path segments.

13. The method according to claim 10, wherein
- at least one of the first and second end nodes is a radio terminal,
- the at least one intermediate node includes a base station, and
- at least one of the path segments is a radio access network segment between the radio terminal and the base station.

14. The method according to claim 13, wherein
- the first and second end nodes are the same radio terminal, and
- the end-to-end path is a round-trip path.

15. The method according to claim 13, wherein the enforcing comprises communicating with the base station to enforce a corresponding one of the required segment performances in the radio access network segment.

16. The method according to claim 10, further comprising:
- obtaining a first monitored performance parameter from a first intermediate node among the at least one intermediate node;
- obtaining a second monitored performance parameter from a second intermediate node among the at least one intermediate node; and
- identifying the first path segment that has not been able to achieve the currently enforced first path required segment performance and the second path segment from among the plurality of path segments that has been able to achieve the currently enforced second path required segment performance based on the first monitored performance parameter and the second monitored performance parameter.

17. The method according to claim 10, wherein the relaxing comprises controlling one or both of packet scheduling and packet queuing performed by one of the end nodes and the at least one intermediate node based on the new first path required segment performance, and
wherein the tightening comprises controlling one or both of packet scheduling and packet queuing performed by one of the end nodes and the at least one intermediate node based on the new second path required segment performance.

18. A non-transitory computer readable medium storing a program for causing a computer to perform a method performed by a control apparatus, the method comprising:

acquiring a required end-to-end performance required for an end-to-end path from a first end node to a second end node, the end-to-end path including the first and second end nodes and at least one intermediate node, the end-to-end path including a plurality of path segments, the required end-to-end performance comprising both of an acceptable end-to-end delay for the end-to-end path and an end-to-end throughput target of the end-to-end path;

determining each required segment performance required for a respective one of the path segments based on the required end-to-end performance, the required segment performance comprising both of an acceptable segment delay for the corresponding path segment and a throughput target for the corresponding path segment;

communicating with a node included in each path segment or communicating with an entity controlling the path segment to enforce a corresponding one of the required segment performances in the path segment, and identifying a first path segment from among the plurality of path segments that has not been able to achieve a currently enforced first path required segment performance enforced on the first path segment;

identifying a second path segment from among the plurality of path segments that has been able to achieve a currently enforced second path required segment performance enforced on the second path segment;

relaxing the currently enforced first path required segment performance enforced on the first path segment to a new first path required segment performance to be enforced on the first path segment by increasing the acceptable segment delay for the first path segment or decreasing the throughput target for the first path segment; and tightening the currently enforced second path required segment performance enforced on the second path segment to a new second path required segment performance to be enforced on the second path segment by decreasing the acceptable segment delay for the second path segment or increasing the throughput target for the second path segment.

19. The non-transitory computer readable medium according to claim 18, wherein the relaxing comprises controlling one or both of packet scheduling and packet queuing performed by one of the end nodes and the at least one intermediate node based on the new first path required segment performance, and wherein the tightening comprises controlling one or both of packet scheduling and packet queuing performed by one of the end nodes and the at least one intermediate node based on the new second path required segment performance.

* * * * *